US010305417B1

(12) United States Patent
Tanghongs

(10) Patent No.: US 10,305,417 B1
(45) Date of Patent: May 28, 2019

(54) SUPPORT MOUNT FOR ROOFTOP SOLAR PANELS

(71) Applicant: James Tanghongs, Richardson, TX (US)

(72) Inventor: James Tanghongs, Richardson, TX (US)

( * ) Notice: Subject to any disclaimer, the term of this patent is extended or adjusted under 35 U.S.C. 154(b) by 0 days.

(21) Appl. No.: 15/837,357

(22) Filed: Dec. 11, 2017

Related U.S. Application Data

(63) Continuation-in-part of application No. 15/463,783, filed on Mar. 20, 2017, now Pat. No. 9,988,818.

(51) Int. Cl.
H02S 20/25 (2014.01)

(52) U.S. Cl.
CPC .................. H02S 20/25 (2014.12)

(58) Field of Classification Search
CPC ....................................... H02S 20/25
See application file for complete search history.

(56) References Cited

U.S. PATENT DOCUMENTS

| 3,397,723 | A | * | 8/1968 | Hervey | B27L 5/00 144/162.1 |
| 4,677,248 | A | * | 6/1987 | Lacey | F24J 2/5211 126/569 |
| 6,269,596 | B1 | * | 8/2001 | Ohtsuka | E04D 3/366 126/621 |
| 7,081,585 | B2 | * | 7/2006 | Oak | H02S 20/10 136/251 |
| 8,122,648 | B1 | | 2/2012 | Liu | |
| 8,776,456 | B1 | | 7/2014 | Schrock | |
| 8,833,032 | B2 | * | 9/2014 | Schaefer | E04C 3/06 52/710 |
| 9,866,168 | B2 | * | 1/2018 | Krajewski | H02S 40/34 |
| 2006/0090788 | A1 | * | 5/2006 | Oak | H02S 20/10 136/244 |
| 2007/0256723 | A1 | * | 11/2007 | Oak | F24S 20/67 136/244 |
| 2007/0266672 | A1 | * | 11/2007 | Bateman | E04D 3/352 52/747.1 |
| 2007/0277450 | A1 | * | 12/2007 | Raulie | B32B 25/00 52/90.1 |
| 2007/0295382 | A1 | * | 12/2007 | Oak | F28D 5/02 136/244 |
| 2008/0179574 | A1 | * | 7/2008 | Yang | C08J 5/2231 252/601 |
| 2009/0113822 | A1 | * | 5/2009 | Patrina | H01L 31/052 52/173.3 |
| 2011/0041429 | A1 | * | 2/2011 | Rummens | F24J 2/4636 52/173.3 |

(Continued)

FOREIGN PATENT DOCUMENTS

JP 08049377 A * 2/1996

Primary Examiner — Jeanette E Chapman
(74) Attorney, Agent, or Firm — Law Office of Sam Sokhansanj PLLC

(57) ABSTRACT

A mounting system, method, and assembly apparatus is disclosed that is relatively easy and inexpensive to install for mounting various equipment to a roof, such as solar panel modules. In particular, the mounting assembly can allow the solar panel modules to be mounted to a thermoplastic polyolefin (TPO) type roof covering, thereby reducing installation costs and the total life cycle cost of a solar panel rooftop power system, among other advantages.

14 Claims, 2 Drawing Sheets

(56) References Cited

U.S. PATENT DOCUMENTS

| | | | |
|---|---|---|---|
| 2011/0067327 A1* | 3/2011 | Eiffert | F24S 25/61 52/173.3 |
| 2012/0110931 A1* | 5/2012 | Eiffert | H01L 31/0521 52/173.3 |
| 2013/0091787 A1 | 4/2013 | Puga | |

* cited by examiner

SUPPORT MOUNT FOR ROOFTOP SOLAR PANELS

CROSS-REFERENCE TO RELATED APPLICATIONS

This application is continuation-in-part (CIP) of U.S. Non-Provisional Application No. 15/463,783 filed on Mar. 20, 2017, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Solar photovoltaic (PV) panel installations on residential and business rooftops are becoming more popular, and consequently there is a need for more effective methods for mounting such equipment to roofs. Roof attachment structures for these solar panels are an often-overlooked aspect of system design and cost, but the roof attachment system is in fact one of the most important aspects of a dwelling structure, such as in the event of water leakage or the loss of structural integrity. For example, conventional mounting brackets allow such equipment to be mounted to a roof, but can leave pathways for water to flow under the roof, resulting in an increased likelihood of roof leakage. In addition, conventional metal roof attachments are very labor-intensive and an expensive step in the installation of a solar panel power system, and improvements in the ease of attachment will have a great impact on the total life cycle cost of a solar panel rooftop power system.

Hence, there is a need for a solar panel roof mounting system that allows for relatively easy and inexpensive mounting of different types of equipment to a roof. Such a system would allow solar panel modules to be mounted to a roof that may use a thermoplastic polyolefin (TPO) rooftop covering, in lieu of conventional standing seam metal or tile roofs. Further, such a needed invention would provide quick and secure mounting to the roof, roof joist, or both. Such a support mount system can allow various types lowcost brackets to be used and further improve integration with various types and sizes of solar panels.

SUMMARY

In one aspect of the disclosure described herein, a mounting system, method, and assembly apparatus is disclosed that is relatively easy and inexpensive to install for mounting various equipment to a roof, such as solar panel modules. In particular, the mounting assembly can allow the solar panel modules to be mounted to a thermoplastic polyolefin (TPO) type roof covering, thereby reducing installation costs and the total life cycle cost of a solar panel rooftop power system, among other advantages.

In another aspect of the disclosure described herein, a rooftop mount assembly is disclosing having a rooftop with a first thermoplastic polyolefin membrane (TPO) covering. The assembly can further include one or more lumbers secured on top of the first TPO covering of the rooftop. In addition, a second TPO covering can be dispensed over and secured to the one or more lumbers. Further, one or more brackets can be secured to the second TPO covering and one or more lumbers. Here, the second TPO covering can be further secured to the first TPO covering. In addition, the assembly can also include at least one piece of lumber or two pieces of lumber stacked on top of each other and secured thereto. Further, the brackets can be configured to secure to one or more solar panel modules or any type of rooftop equipment or installation.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Figure 1:
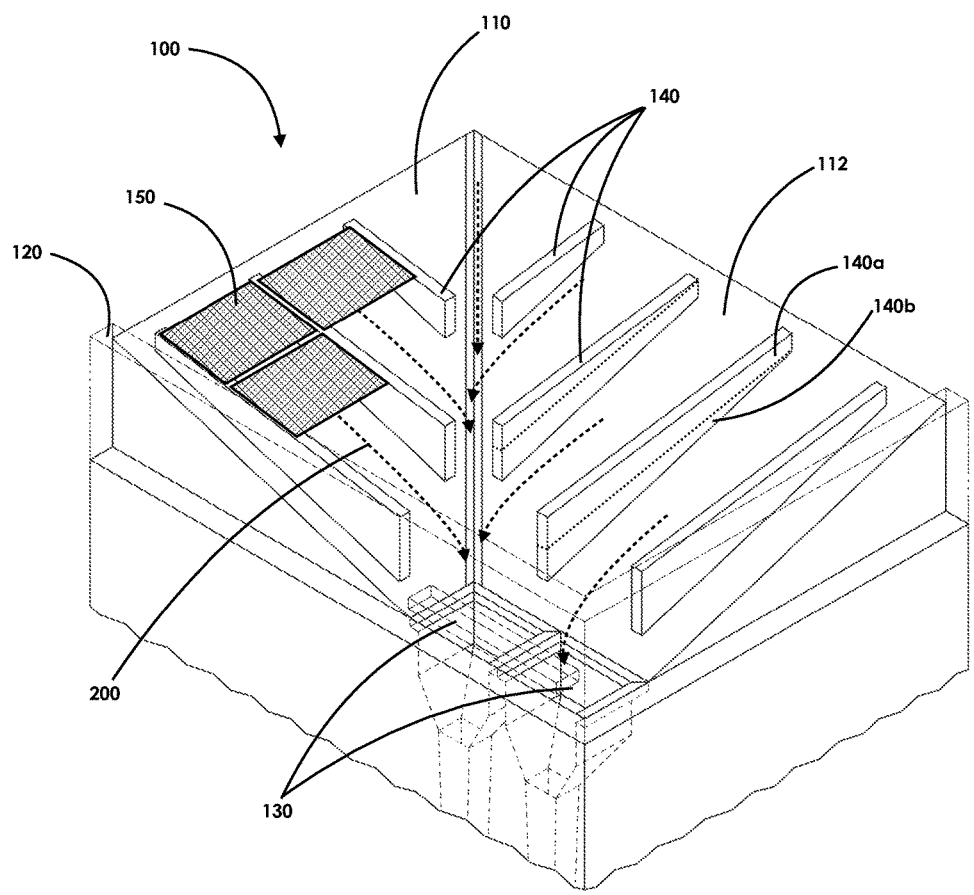
FIG. 1 illustrates a perspective view for one non-limiting embodiment of a dwelling roof having one or more support mounts of the disclosure described herein, shown supporting one or more solar panel modules.

FIG. 1 illustrates one non-limiting embodiment of a support mount assembly for one or more solar panels of a dwelling 100. In particular, dwelling or building 100 includes a sloped roof 110 having a thermoplastic polyolefin membrane (TPO) roof covering 112. Dwelling or building 100 further includes raised parapet walls 120, such that they conceal or hide any one or more rooftop attachments, such as solar panel modules 150 from view. In addition, roof 110 of dwelling 100 further includes a pair of water drains or gutters such that they direct rain water or other rooftop debris away from roof 110 and to the exterior of the dwelling. Here, drains 130 and and their associated piping are configured such that they are disposed within the walls of the dwelling (between exterior and interior walls), and concealed from view from either the exterior of the dwelling or interior of the dwelling.

Still referring to FIG. 1, dwelling or building 100 includes multiple support mounts 140 for securing and supporting multiple solar panel modules 150. Here, mounts 140 are constructed, positioned, and raised at certain angles to maximize solar collection view for solar panels 150. In addition, mounts 140 further include a TPO membrane material disposed over them to further prevent water leaks in or around mounts 140 with respect to roof 110, and to further improve the heating and cooling efficiency of the dwelling. Moreover, raised mounts 140 can further operate as guides for diverting rainwater or other debris away from panels 150 and roof 110 towards drains 130 for proper drainage. Here, the use of a TPO membrane roof and TPO covered mounts 140 can significantly reduce costs with the construction of the dwelling relative to traditional standing seam metal roofs or tiled roofs, and wherein parapet walls 120 can further conceal the TPO material, mounts 140, and panels 150 from the view of an observer from ground level relative to the dwelling, among other advantages.

Figure 2:
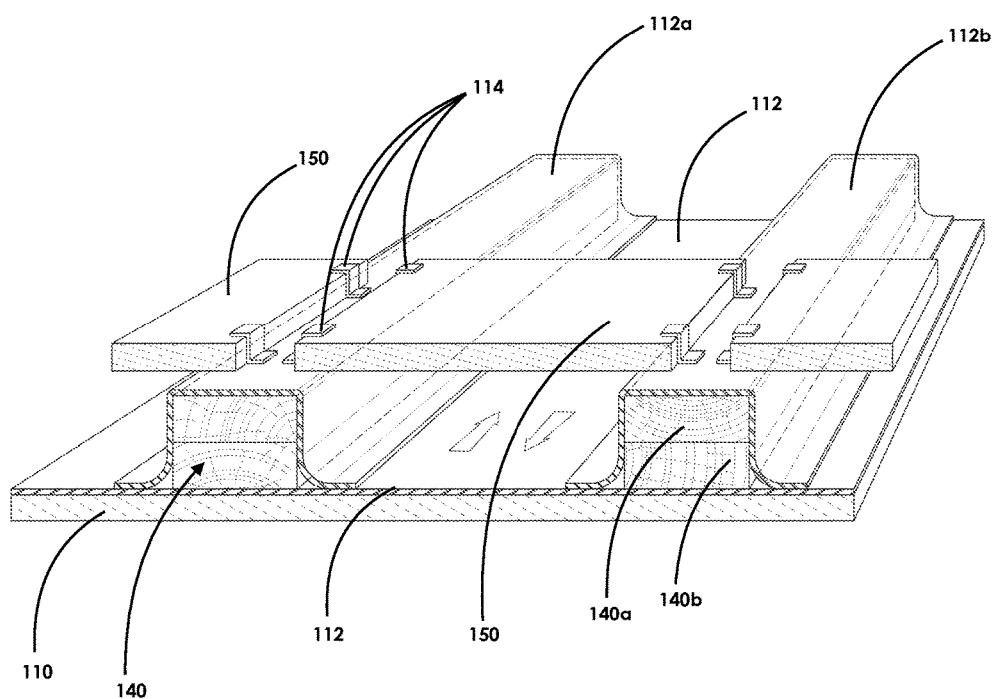
FIG. 2 illustrates a perspective view close-up and cross-section view of the one or more support mounts of the disclosure described herein, shown supporting one or more solar panel modules.

FIG. 2 illustrates a close-up cross-sectional perspective view of the rooftop 110 of the dwelling 100. More specifically, rooftop 110 can be comprised of any one or more roof layers, such as wood, composite wood, insulation material, underlayment, wool, cellulose, polyurethane foam, or polystyrene, or the like. Further, secured to rooftop material 110 can be any type of rain barrier material, such as TPO membrane layer 112. Here, TPO layer 112 can have any type of self-adhesive, additional adhesive, or any type of fasteners such that it is secured to rooftop 110. Moreover, once TPO layer 112 is secured to roof 110, mounts 140 can be constructed and assembled. In particular, mounts 140 are comprised of a pair of lumber or wood boards 140a and 140b that are stacked and secured to each other. In the current embodiment, boards 140a and 140b are each comprised of 2×4 lumber. However, in other embodiments, mounts 140 can include just one piece of lumber or two or more lumber boards secured to each other to create mounts 140. For example, mounts 140 could also be 1×4, 2×2, or 2×6 lumber secured to each other to raise mount 140. In addition, boards 140a and 140b may also be rotated 90 degrees and mounted transversely or in the upright position, as shown in FIG. 1. In addition, as shown in FIG. 1, one of or more of the boards, either 140a or 140b, may also be configured in a wedged shape to accommodate various angles or elevations, such that solar panels 150 may be positioned in the desired orientation. Here, boards 140a and 140b can be secured to each other and to roof 110 via any type of adhesive, such as wood glue, or any type of fastener, such as nails, screws, brackets, or clamps.

Still referring to FIG. 2, once mounts 140 have been secured to each other and placed in pre-defined positions on rooftop 110 and further secured and affixed to rooftop 110, they can then be covered with their own layer of TPO membrane 112a and 112b. Here, layers 112a and 112b can each be cut to size and further include their own self-adhesive or any additional adhesive or fastener for securing and to lumber 140a and 140b and layer 112 of rooftop 110, as shown. In addition, a pair of brackets 114 can be positioned and secured to each side of mounts 140 such that they securely hold solar panels 150 in place. More specifically, brackets 114 can be any type of a bracket, such as a C-bracket, S-bracket, or L-bracket, among others, such that each securely holds a side of a solar panel 150 and secures it to the mount 140. For example, brackets 114 can each be secured to mount 140 via fasteners, such as threaded screws, and further secured to panels 150 via corresponding fasteners, such as nuts and bolts, among others. Further, brackets 114 can be sized to a pre-defined configurations such that they can accommodate any size or width solar panel module or rooftop equipment.

Since many possible embodiments may be made of the invention without departing from the scope thereof, it is to be understood that all matters herein set forth or shown in the accompanying drawings are to be interpreted as illustrative, and not in a limiting sense. While specific embodiments have been shown and discussed, various modifications may of course be made, and the disclosure described herein is not limited to the specific forms or arrangement of parts or method of assembly described herein, except insofar as such limitations are included in the following claims. Further, it will be understood that certain features and sub-combinations are of utility and may be employed without reference to other features and sub-combinations.

What is claimed is:

1. A method of installing a rooftop mount assembly, comprising:
   securing a first water barrier covering to a rooftop;
   securing a first lumber secured to a second lumber, wherein the first and second lumber are further secured on top of the first water barrier covering;
   securing a second water barrier covering to and over the first and second lumber;
   securing one or more brackets to the second water barrier covering, wherein the one or more brackets are adapted to secure to one or more solar panel modules;
   securing a third lumber to a fourth lumber, wherein the third and fourth lumber oppose the first and second lumber, such that a channel is formed between the first and second lumber and the third and fourth lumber, and wherein the first, second, third, and fourth lumber each are comprised of dimensional lumber.

2. The method of claim 1, further comprising securing the second water barrier covering to the first water barrier covering.

3. The method of claim 1, further comprising stacking the first and second lumber on top of each other.

4. The method of claim 1, wherein the brackets further comprise an L-shaped configuration.

5. The method of claim 1, wherein the first and second lumber are configured in an upright configuration.

6. A method of installing a rooftop mount assembly, the method comprising:
   securing a first thermoplastic polyolefin (TPO) layer to a rooftop;
   securing a first elongated wood dimensional lumber to a second first elongated wood dimensional lumber;
   securing the first and second elongated wood dimensional lumber to the rooftop;
   disposing a second TPO layer over first and second elongated wood dimensional lumber; and
   securing one or more brackets to the first or second elongated wood dimensional lumber, wherein the brackets are adapted to secure to one or more solar panel modules;

securing the third and fourth elongated wood dimensional lumber to the rooftop, wherein the third and fourth wood dimensional lumber oppose the first and second wood dimensional lumber, such that a channel is formed underneath the one or more solar panel modules and between the first and second wood dimensional lumber and the third and fourth wood dimensional lumber.

7. The method of claim 6, further comprising securing the second TPO layer to the first TPO layer.

8. The method of claim 6, stacking the first and second elongated wood dimensional lumber on top of each other.

9. The method of claim 6, further comprising securing one or more rooftop installations to the brackets.

10. The method of claim 6, further comprising positioning the first and second elongated wood dimensional lumber.

11. A method of installing a rooftop mount assembly, comprising:
   securing a first lumber over a first water barrier covering;
   securing a second lumber to the first lumber, wherein the first and second lumber are disposed over the first water barrier covering;
   securing a second water barrier covering over the first and second lumber;
   securing one or more brackets over the second water barrier covering, wherein the one or more brackets are adapted to secure to one or more solar panel modules;
   securing a third and fourth lumber to each other and over the first water barrier covering, wherein the third and fourth lumber oppose the first and second lumber, such that a channel is formed underneath the one or more solar panel modules and between the first and second lumber and the third and fourth; and
   wherein the first, second, third, and fourth lumber each comprise a substantially rectangular cross-section.

12. The method of claim 11, further comprising securing the second water barrier covering to the first water barrier covering.

13. The method of claim 11, wherein the first and second water barrier coverings are further comprised of a thermoplastic polyolefin (TPO) covering.

14. The method of claim 11, further comprising stacking the second lumber on top of the first lumber.

* * * * *